US012376005B2

(12) United States Patent
Park et al.

(10) Patent No.: US 12,376,005 B2
(45) Date of Patent: Jul. 29, 2025

(54) ELECTRONIC DEVICE, METHOD, AND NON-TRANSITORY STORAGE MEDIUM FOR MITIGATING LOCATION TRACKING

(71) Applicant: Samsung Electronics Co., Ltd., Suwon-si (KR)

(72) Inventors: Woojin Park, Suwon-si (KR); Donguk Kim, Suwon-si (KR); Choonghoon Lee, Suwon-si (KR); Jungil Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 466 days.

(21) Appl. No.: 17/576,227

(22) Filed: Jan. 14, 2022

(65) Prior Publication Data

US 2022/0225213 A1 Jul. 14, 2022

Related U.S. Application Data

(63) Continuation of application No. PCT/KR2022/000664, filed on Jan. 13, 2022.

(30) Foreign Application Priority Data

Jan. 14, 2021 (KR) .................. 10-2021-0005406

(51) Int. Cl.
*H04W 48/08* (2009.01)
*H04M 1/72463* (2021.01)
*H04W 48/04* (2009.01)

(52) U.S. Cl.
CPC ....... *H04W 48/08* (2013.01); *H04M 1/72463* (2021.01); *H04W 48/04* (2013.01)

(58) Field of Classification Search
CPC ... H04W 48/08; H04W 48/04; H04W 12/122; H04W 12/30; H04W 48/14; H04W 84/12;
(Continued)

(56) References Cited

U.S. PATENT DOCUMENTS

2006/0262932 A1* 11/2006 Sood ................... H04W 12/069
380/272
2008/0057913 A1* 3/2008 Sinha ................. H04W 12/122
455/414.1
(Continued)

FOREIGN PATENT DOCUMENTS

JP 2020-053866 A 4/2020
KR 10-2012-0070472 A 6/2012

OTHER PUBLICATIONS

Jeremy Martin et al., "A Study of MAC Address Randomization in Mobile Devices and When it Fails", Proceedings on Privacy Enhancing Technologies ; 2017 (4):268-286, 2017-01.
(Continued)

*Primary Examiner* — Abdullahi E Salad
(74) *Attorney, Agent, or Firm* — Jefferson IP Law, LLP

(57) ABSTRACT

An operation method in an electronic device for mitigating location tracking, and a non-transitory storage medium are provided. The electronic device includes a communication module, a memory and at least one processor electrically connected to the communication module and the memory, wherein the at least one processor is configured to identify a type of at least one executed application, randomly select at least one information element to be included in a frame for wireless communication for the at least one executed application, based on the identified type, generate at least one frame comprising the at least one selected information element, and control the communication module to transmit the at least one generated frame through the wireless communication.

24 Claims, 10 Drawing Sheets

(58) Field of Classification Search
CPC ..... H04W 4/029; H04W 12/02; H04W 12/06; H04W 12/35; H04M 1/72463; H04M 1/72457
See application file for complete search history.

(56) References Cited

U.S. PATENT DOCUMENTS

| | | |
|---|---|---|
| 2008/0205425 A1 | 8/2008 | Vuppula et al. |
| 2011/0179486 A1 | 7/2011 | Park et al. |
| 2012/0154413 A1 | 6/2012 | Kim et al. |
| 2014/0173071 A1 | 6/2014 | Hazen et al. |
| 2015/0271745 A1* | 9/2015 | Knowles ................. H04W 8/24 370/254 |
| 2015/0332060 A1 | 11/2015 | Tsumura et al. |
| 2016/0135053 A1 | 5/2016 | Lee et al. |
| 2016/0269359 A1 | 9/2016 | Adrangi et al. |
| 2016/0285834 A1 | 9/2016 | Lee et al. |
| 2017/0006529 A1 | 1/2017 | Brookes |
| 2017/0171745 A1 | 6/2017 | Asterjadhi |
| 2017/0181130 A1* | 6/2017 | Bharadwaj ........... H04B 7/0452 |
| 2018/0132234 A1* | 5/2018 | Cavalcanti ............ H04W 72/02 |
| 2019/0098561 A1* | 3/2019 | Zhou ..................... H04W 16/28 |
| 2019/0132219 A1 | 5/2019 | Gandhi |
| 2019/0174449 A1* | 6/2019 | Shan ..................... H04W 60/04 |
| 2019/0296996 A1* | 9/2019 | Wee ..................... H04W 24/08 |
| 2019/0305997 A1* | 10/2019 | Lee ....................... H04L 5/0053 |
| 2022/0408506 A1* | 12/2022 | Kim ..................... H04W 28/20 |

OTHER PUBLICATIONS

Jeremy Martin et al., "Decomposition of MAC Address Structure for Granular Device Inference", Jan. 2016.
Celestin Matte et al., "Defeating MAC Address Randomization Through Timing Attacks", Jan. 2016.
John S. Atkinson et al., "Your WiFi is leaking: What do your mobile apps gossip about you?", Future Generation Computer Systems, Aug. 31, 2015.
International Search Report with Written Opinion dated Apr. 19, 2022; International Appln. No. PCT/KR2022/000664.
Extended European Search Report dated Apr. 24, 2024, issued in European Patent Application No. 22739724.7.
Korean Office Action dated Jun. 20, 2025, issued in Korean Patent Application No. 10-2021-0005406.

* cited by examiner

1

ELECTRONIC DEVICE, METHOD, AND NON-TRANSITORY STORAGE MEDIUM FOR MITIGATING LOCATION TRACKING

CROSS-REFERENCE TO RELATED APPLICATION(S)

This application is a continuation application, claiming priority under § 365(c), of an International application No. PCT/KR2022/000664, filed on Jan. 13, 2022, which is based on and claims the benefit of a Korean patent application number 10-2021-0005406, filed on Jan. 14, 2021, in the Korean Intellectual Property Office, the disclosure of which is incorporated by reference herein in its entirety.

TECHNICAL FIELD

The disclosure relates to an electronic device, a method, and a non-transitory storage medium for mitigating location tracking.

BACKGROUND ART

Recently, an electronic device has been developed in various forms for convenience of a user and has provided various services or functions.

Wireless communication can be performed in various schemes to transmit or receive information according to execution of various services or functions of the electronic device.

The electronic device may configure a frame in the form of a data frame and a management frame to transmit or receive information for wireless communication with an external device, and perform the wireless communication by transmitting or receiving a message including the configured frame. The data frame may be configured such that actual data of services or an application executed after a wireless communication association can be transmitted or received. The management frame may be configured such that control information for a wireless communication association or disassociation can be transmitted or received before/after the wireless communication association.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

The entire frame of a management frame for wireless communication may be configured in plain text and all frames may be configured to have the same pattern. An external device may track the location of a user by using user and device information acquired by intercepting a transmitted or received management frame and analyzing information included in the frame. Accordingly, the location of the user can be tracked by an external attacker, which may cause the user to be at a risk of unintended privacy exposure, whereby a problem of a criminal misuse of exposed information may occur.

Aspects of the disclosure are to address at least the above-mentioned problems and/or disadvantages and to provide at least the advantages described below. Accordingly, an aspect of the disclosure is to provide an electronic device, a method, and a non-transitory storage medium for mitigating location tracking by configuring a frame (or a management frame) for wireless communication to prevent the frame from being misused.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communication module, a memory, and at least one processor, wherein the at least one processor is configured to identify a type of at least one executed application, randomly select at least one information element to be included in a frame for wireless communication for the at least one executed application, based on the identified type, generate at least one frame including the at least one selected information element, and control the communication module to transmit the at least one generated frame through the wireless communication.

In accordance with another aspect of the disclosure, a method performed by an electronic device is provided. The method includes identifying a type of at least one executed application, randomly selecting at least one information element to be included in a frame for wireless communication for the at least one executed application, based on the identified type, generating at least one frame including the at least one selected information element, and transmitting the at least one generated frame through the wireless communication.

According to an embodiment, in a non-transitory storage medium configured to store a program, the program may include executable instructions which, when executed by a processor of an electronic device, causes the processor to identify a type of at least one executed application, randomly select at least one information element to be included in a frame for wireless communication for the at least one executed application, based on the identified type, generate at least one frame including the at least one selected information element, and transmit the at least one generated frame through the wireless communication.

Advantageous Effects

According to an embodiment, a frame body field and/or a sequence control field including an information element randomly selected for each application type may be randomly configured and one or more different frames may be generated and transmitted, whereby tracking the location of a user by intercepting a transmitted frame and analyzing user information by an external attacker can be mitigated. Accordingly, unintended privacy exposure to the external attacker and the misuse of the exposed information by the external attacker can be prevented.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "user" used in various embodiments may refer to a person using an electronic device or a device using an electronic device (for example, an artificial intelligent electronic device).

Figure 1:
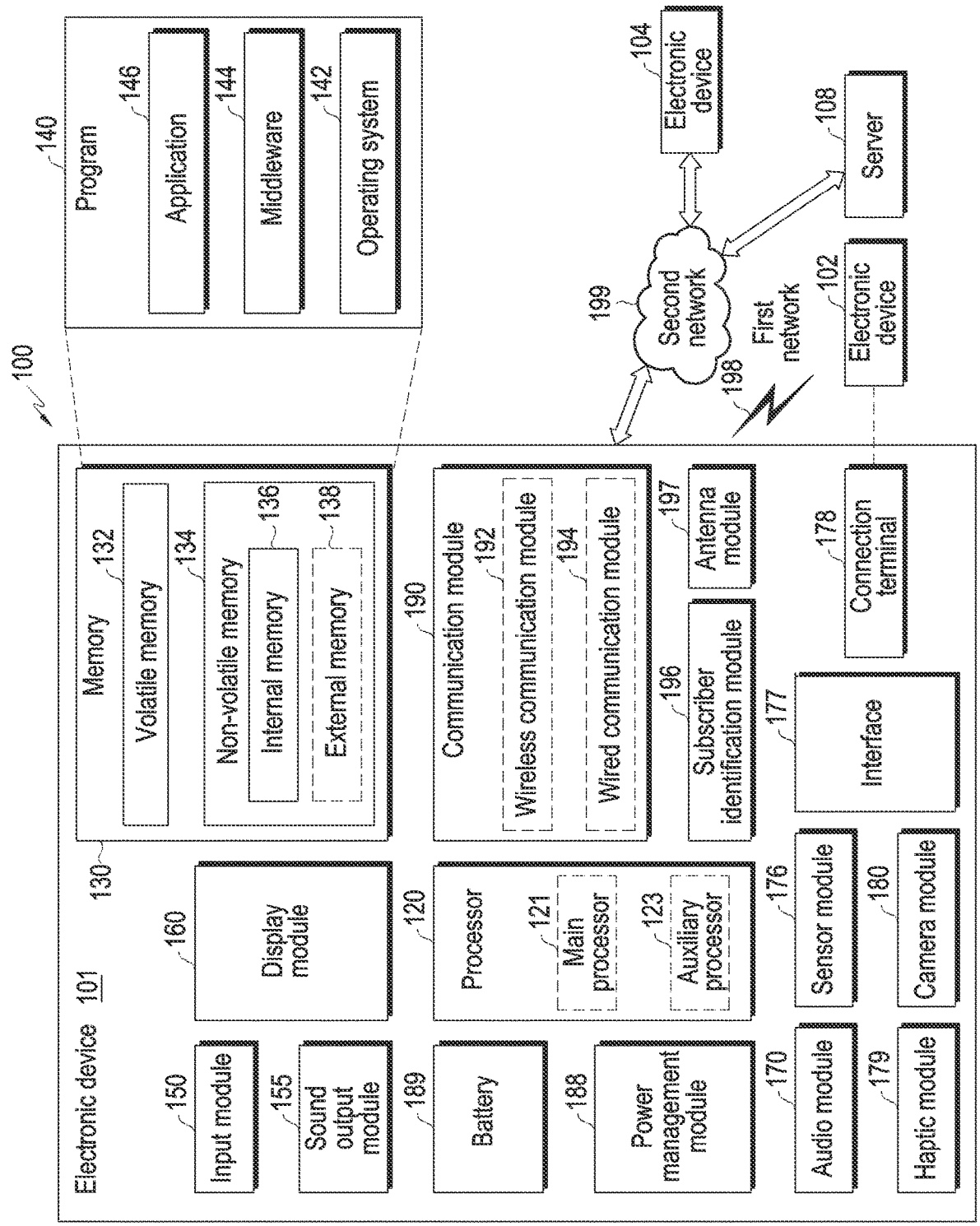
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
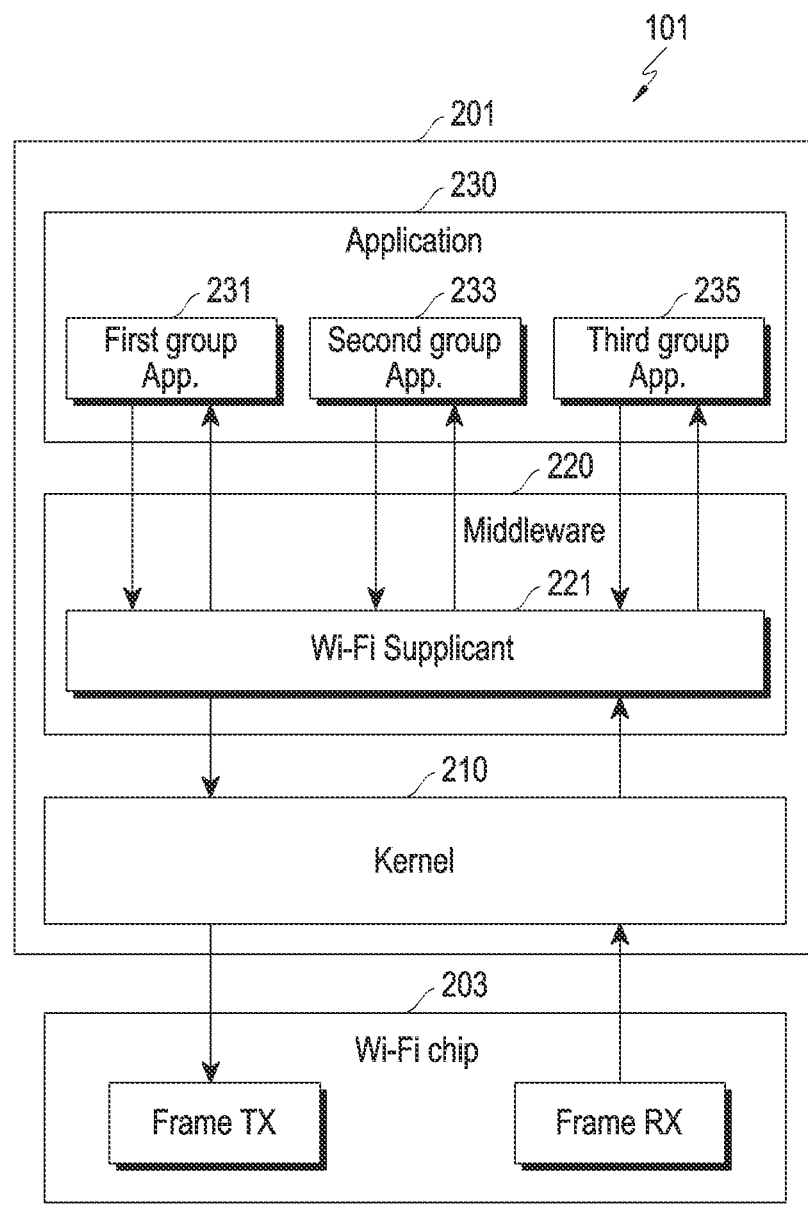
FIG. 2 illustrates an example of a configuration of an electronic device for wireless communication according to an embodiment of the disclosure.

FIG. 2 illustrates an example of a configuration of an electronic device according to an embodiment of the disclosure.

Referring to FIGS. 1 and 2, the electronic device 101 according to an embodiment may implement a software module 201 (e.g., the program 140 of FIG. 1) and a hardware wireless communication module 203 (e.g., Wi-Fi chip including frame TX and frame RX or the communication module 190 of FIG. 1) for performing wireless communication. The memory 130 of the electronic device 101 may store instructions (e.g., instructions) to implement the software module 201 illustrated in FIG. 2. The at least one processor 120 may execute the instructions stored in the memory 130 to implement the software module 201 illustrated in FIG. 2, and control a hardware (e.g., the sensor module 176, the power management module 188, or the communication module 190 of FIG. 1) associated with a function of the software module 201.

Referring to FIG. 2, the software module 201 of the electronic device 101 according to an embodiment may be configured to include a kernel 210 (or a hardware abstraction layer (HAL)), a middleware 220 (e.g., the middleware 144 of FIG. 1), and an application 230 (e.g., the application 146 of FIG. 1). At least a part of the software module 201 may be preloaded on the electronic device 101 or may be downloaded from a server (e.g., the server 108).

According to an embodiment, the kernel 210 may include, but is not limited to, for example, a system resource manager or a device driver, and may be configured to further include other modules. The kernel 210 may connect a wireless communication frame to the wireless communication module 203 for transmission and reception by means of the device driver (e.g., a network driver). The system resource manager may be performed during controlling, allocation, or reclaiming of a system resource. The device driver may include, for example, a display driver, a camera driver, a Bluetooth driver, a shared memory driver, a USB driver, a keypad driver, a network driver (e.g., a Wi-Fi driver), an audio driver, or an inter-process communication (IPC) driver.

According to an embodiment, the middleware 220 may provide a function commonly used by the application 230, or may provide the application 230 with various functions through an application programming interface (API) (not shown) so that the application 230 can efficiently use limited system resources in the electronic device 101. The middleware 220 (e.g., a framework) may be configured to include a wireless communication configuration module 221 (e.g., a Wi-Fi supplication). For example, the wireless communication configuration module 221 may manage wireless connection in a wireless communication scheme (e.g., Wi-Fi or Bluetooth). The middleware 220 may include a module for forming a combination of various functions of the above-described elements. The middleware 220 may provide a module specialized for each type of operating system to provide a differentiated function. The middleware 220 may dynamically exclude some of the existing elements, or may further include new elements.

According to an embodiment, the application 230 may include a wireless communication application (a function, a service, an application program, or an app) directly performing wireless communication, a location-related application (a function, a service, an application program, or an app), and/or other application (e.g., a function, a service, an application program, or an app). The application 230 may include applications classified and grouped according to an application type, based on a purpose of an association or disassociation of a user or a purpose of location identification. For example, the application 230 may include at least one application (first group App.) 231 classified as a first application type in a first group. The application 230 may include at least one application (second group App.) 233 classified as a second application type in a second group. The application 230 may include at least one application (third group App.) 235 classified as a third application type in a third group. According to an embodiment, the application 230 may include an application received from an external electronic device (e.g., the server 108 or the electronic device 102 or 104). According to an embodiment, the application 230 may include a preloaded application or a third-party application which can be downloaded from a server. Elements of the software module 201 according to the illustrated embodiment and names of the elements may vary according to the type of operating system. According to an embodiment, at least a part of the software module 201 may be implemented as software, firmware, hardware, or a combination of two or more thereof. For example, the at least a part of the software module 201 may be implemented (e.g., executed) by the processor 120. At least a part of the software module 201 may include, for example, a module, a program, a routine, sets of instructions, and/or a process for performing at least one function.

Referring to FIGS. 1 and 2, a processor 120 of an electronic device (e.g., the electronic device 101 of FIGS. 1 and 2) according to an embodiment may control the overall operation of the electronic device 101. The processor 120 may perform a control to execute at least one application (at least one of 231, 233, or 235) included in the application 230, and perform a control to transmit and/or receive a message including a wireless communication frame to/from an external device through the at least one executed application. The processor 120 may generate a frame to be transmitted through the at least one executed application. The processor 120 may perform a control to group applications included in the application 230 according to the types of the applications, based on at least one of a purpose of an association or a disassociation of a user or a purpose of location identification. For example, the processor 120 may perform a control to group at least one application 231 having a first application type into a first group, perform a control to group at least one application 233 having a second application type into a second group, and perform a control to group at least one application 235 having a third application into a third group. For example, the at least one application 231 having the first application type may correspond to an application for performing a procedure of an operation for an association of wireless communication (e.g., Wi-Fi) through an AP scan operation (e.g., scanning of network discovery), an association establishment procedure, and a disassociation operation (e.g., a 4-way handshake). The at least one application 231 having the first application type may correspond to an application for performing direct wireless communication according to the purpose (or intention) of an association/disassociation of a user. When executing the at least one application 231 having the first application type, the processor 120 may perform a control to display a scanned AP list and an execution screen (e.g., a user interface (UI)) for configuring the association/disassociation of wireless communication (Wi-Fi), on the display module 160. For example, the at least one application 233 having the second application type may correspond to an application (e.g., an application using location tracking or a nearby Wi-Fi signal (e.g., AP information) by fingerprinting the same (e.g., a navigation application, a photo application, a lost child prevention application, a shopping application, or a weather application)) for identifying the location of the electronic device 101 and/or another external electronic device, based on signals received from APs located in an adjacent area and/or packets collected through packet monitoring within the adjacent area. The at least one application 233 having the second application type may correspond to a location-based application which has no purpose (or intention) of an association/disassociation of wireless communication and is related to location identification (or tracking). For example, the at least one application 235 having the third application type may correspond to an application for transmitting/receiving a message to/from an external electronic device through an AP associated with wireless communication (e.g., a short message service (SMS) application, a note application, a messenger application, or a social network service (SNS) application). The at least one application 235 having the third application type may correspond to an application having no purpose (or intention) of an association/disassociation of wireless communication and having no purpose (or intention) of location identification. The at least one application 235 having the third application type may correspond to an application executed for transmission/reception of a message using wireless communication after the association with the AP is completed through the wireless communication association operation.

The main elements of the electronic device have been described in an embodiment through the electronic device 101 of FIGS. 1 and 2. In various embodiments, however, all of the elements of FIGS. 1 and 2 are not mandatory elements, and the electronic device 101 may be implemented with more or fewer elements than the illustrated elements. The positions of the main elements of the electronic device 101 described through FIGS. 1 and 2 may change according to various embodiments.

Figure 3:
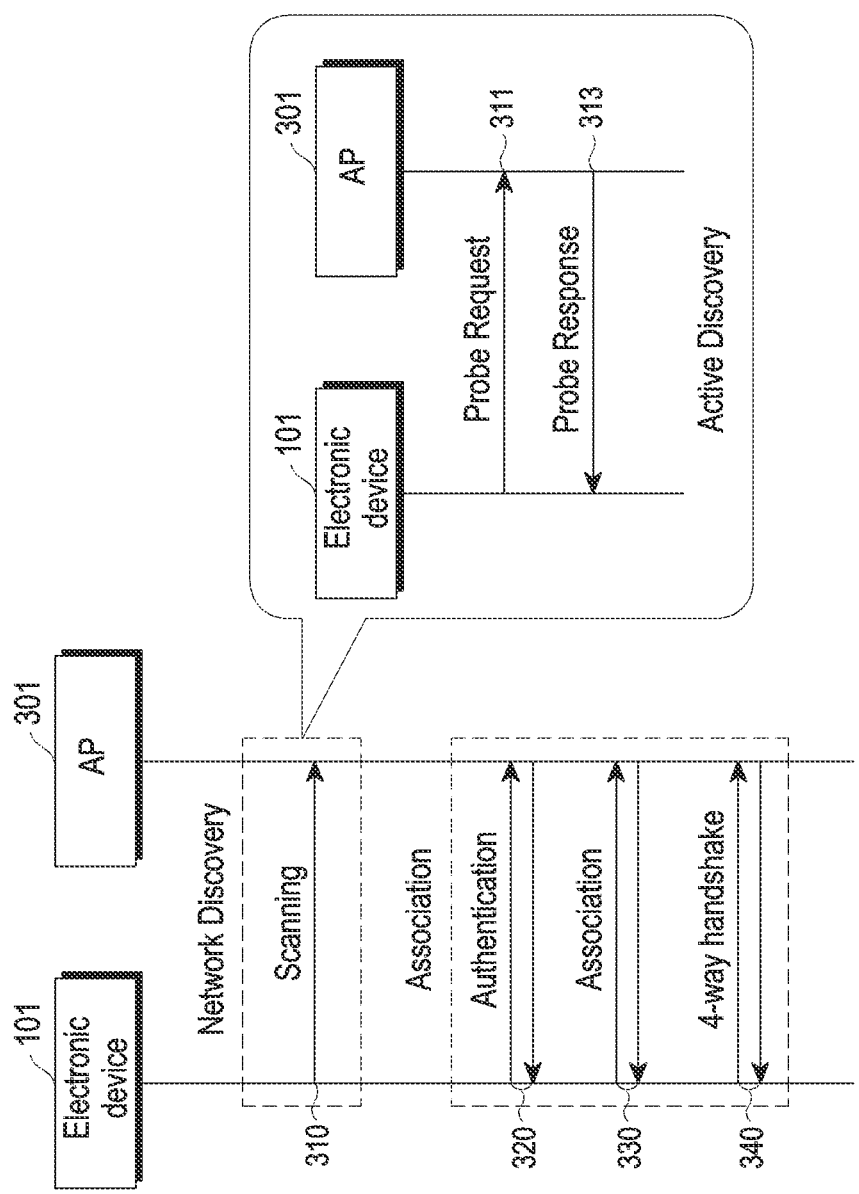
FIG. 3 illustrates an example of a wireless communication association procedure according to an embodiment of the disclosure.
Figure 4:
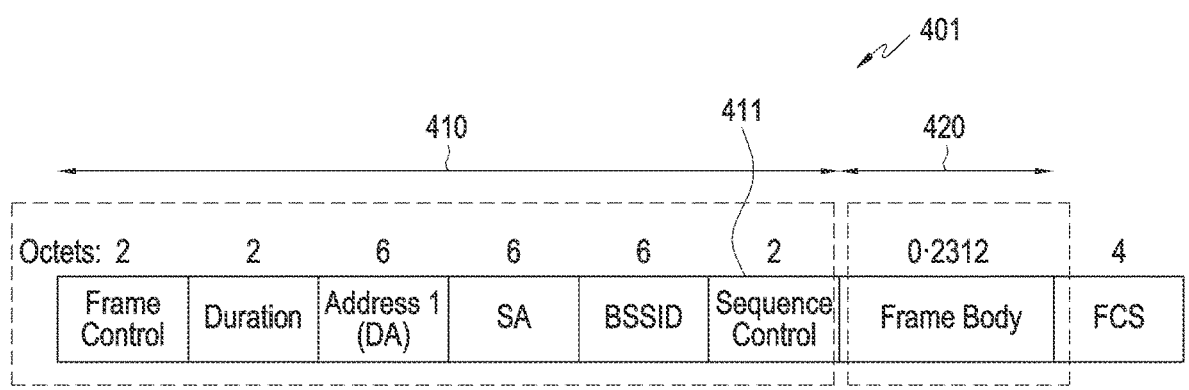
FIG. 4 illustrates an example of a configuration of a frame according to an embodiment of the disclosure.

FIG. 3 illustrates an example of a wireless communication association procedure according to an embodiment of the disclosure, and FIG. 4 illustrates an example of a configuration of a frame according to an embodiment of the disclosure.

Referring to FIGS. 1 and 3, when a wireless communication application (e.g., the first group application 231 of FIG. 2) included a first group of the application 230 is executed, the processor 120 of the electronic device 101 according to an embodiment may control a communication module (e.g., the wireless communication module 192 of FIG. 1 and the wireless communication module 203 of FIG. 2) to perform an operation procedure for an association of wireless communication (e.g., Wi-Fi) through the executed wireless communication application. For example, the association operation procedure of the wireless communication may be performed based on the wireless communication standard (for example, IEEE 802.11).

According to an embodiment, as shown in FIG. 3, the processor 120 may control the communication module to perform an operation 310 of scanning a surrounding access point (AP) through a network discovery procedure for a wireless communication association. When performing the scanning operation 310, the processor 120 may control the communication module to perform a procedure(e.g., active discovery) of transmitting a probe request message (or frame) 311 and receiving a probe response message 313 from the surrounding AP 301. For example, the probe request message 311 may be periodically transmitted at a designated time interval. The processor 120 may perform a control to connect to an AP 301 through an association establishment procedure (e.g., an authentication operation 320 and an association operation 330) for wireless communication between the electronic device 101 and the AP 301 scanned through the scanning operation 310. The processor 120 may perform a control to perform a disassociation operation 340 (e.g., a 4-way handshake) for a disassociation between the electronic device 101 and the AP 301.

According to an embodiment, the processor 120 may generate at least one frame included in a message transmitted from the electronic device to the AP 301 through the scanning operation 310 for wireless communication between the electronic device 101 and the access point (AP) 301, the authentication operation 320, and the association operation 330 or the disassociation operation 340. For example, the at least one frame may correspond to a probe request frame, an authentication request frame, an association request frame, or a disassociation frame (4-way handshake frame). The at least one frame may correspond to a management frame in which the whole frame is transmitted in plain text. For example, the management frame is generated before or after the wireless communication association, and may be used for a wireless communication association/disassociation control and location tracking.

According to an embodiment, when receiving an execution request input of the first group application 231 illustrated in FIG. 2, the processor 120 may control the display module 160 to display a user interface (UI) for configuring a wireless communication association/disassociation. The UI displayed on the display module 160 may include at least one of an object for configuring a wireless association/disassociation (or wireless communication on/off) and a wireless communication (e.g., Wi-Fi) network list, an object related to a network search, or other object for other wireless communication configurations. When a wireless communication association/disassociation request is configured through the user interface (UI), the processor 120 may control a communication module (e.g., the wireless communication module 192 of FIG. 1 and the wireless communication module 203 of FIG. 2) to perform a procedure for a wireless communication association illustrated in FIG. 3.

According to an embodiment, at least one frame 401 included in a wireless communication message to be transmitted to the AP 301 may include, as shown in FIG. 4, header information 410 (e.g., a media access control (MAC) header), a frame body field 420, and an error detection field (a frame check sequence (FCS)) part. The header information 410 may include a frame control field, a duration field, address information fields (adrees 1(DA), SA, and/or basic service set identifier (BSSID)), and a sequence control field 411. The frame body field 420 may include designated information elements (IEs). For example, the designated IEs may be divided into a mandatory IE and an optional IE. For example, the probe request frame may include a designated number of multiple options IEs (e.g., 19 optional IEs such as SSID/Request/SSID list. etc.) without a mandatory IE. For example, the authentication request frame may include two mandatory IEs (e.g., an authentication algorithm number and an authentication transaction sequence number) and a designated number of multiple options IEs (e.g., 17 optional IEs such as a status code, etc.). For example, the association request frame may include three mandatory IEs (e.g., capability information, a listen interval, and an SSID IE) and a designated number of multiple optional IEs (e.g., 23 optional IEs such as power capability, etc.).

Referring to FIGS. 1 to 4, the processor 120 of the electronic device 101 according to an embodiment may perform a control to generate at least one frame 401 in different manners for each application type or each application and transmit the same so as to prevent misuse of the frame, caused by performing of device tracking or device operation tracking through the at least one frame 401 generated for wireless communication. According to an embodiment, when generating the frame 401 for wireless communication, the processor 120 may identify an application type of a group to which an executed application belongs, and generate different frames to be transmitted for wireless communication, according to the application type.

According to an embodiment, upon the execution of the at least one application, when an event related to frame transmission according to the purpose (or intention) of the wireless communication association/disassociation or the purpose (or intention) for location search occurs, the processor 120 may identify an application type of a group to which the at least one application belongs. The event corresponds to an event indicating a situation required for the frame transmission, and may be, for example, an event occurring according to a situation in which a direct wireless communication (e.g., Wi-Fi) association or disassociation is requested by a user, a situation in which wireless communication (e.g., Wi-Fi) is turned on upon the a location tracking request, or a situation in which the wireless communication is turned on regardless of the direction wireless communication (e.g., Wi-Fi) association or disassociation or the location tracking request.

According to an embodiment, the processor 120 may randomly configure the sequence control field 411 and/or the frame body field 420 of the frame 401, based on the identified application type, and generate at least one frame to be transmitted. The processor 120 may control a communication module (e.g., the wireless communication module 192 of FIG. 1 or the wireless communication module 203 of FIG. 2) to transmit a message including the at least one generated frame 401 to the AP 301 through wireless communication.

According to an embodiment, when generating the at least one frame 401 to be transmitted, the processor 120 may randomly combine the types and/or the number of designated IEs to generate different frames for each application type, instead of including all of the designated IEs in the frame body field 420 in the same or a similar manner For example, the processor 120 may mandatorily select the mandatory IE from among multiple IEs and randomly select an optional IE, so as to generate at least one frame 401 to be transmitted. According to an embodiment, the processor 120 may randomly configure a sequence value of the sequence control field 411 of the header information 410. For example, when transmitting multiple frames for wireless communication by the execution of one application, the processor 120 may randomly configure the frame body field 420 and/or the sequence control field 411 of the header information 410 of each of the multiple frames to generate different frames, and may control a wireless communication module (e.g., the wireless communication module 192 of FIG. 1 and the wireless communication module 203 of FIG. 2) to sequentially transmit the generated frames.

Figure 5A:
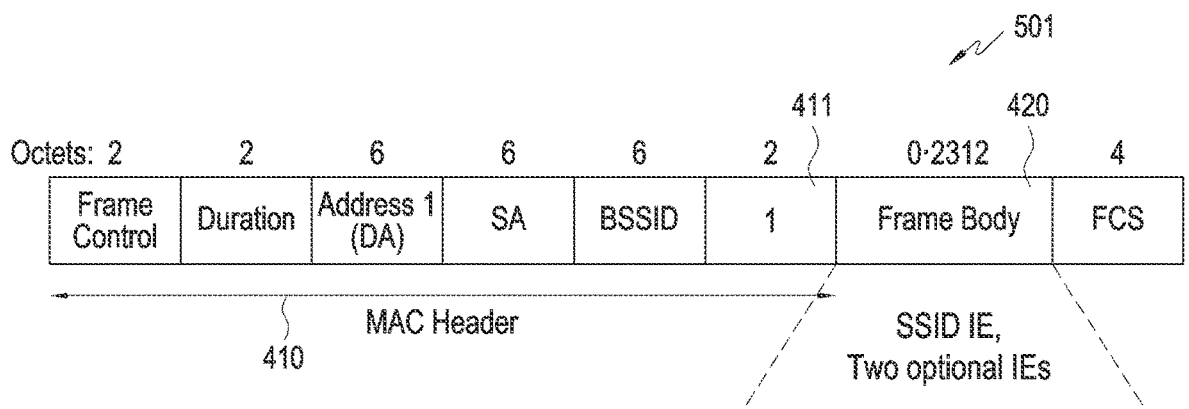
FIGS. 5A, 5B, and 5C illustrate examples of a configuration of a frame according to an embodiment of the disclosure.
Figure 5B:
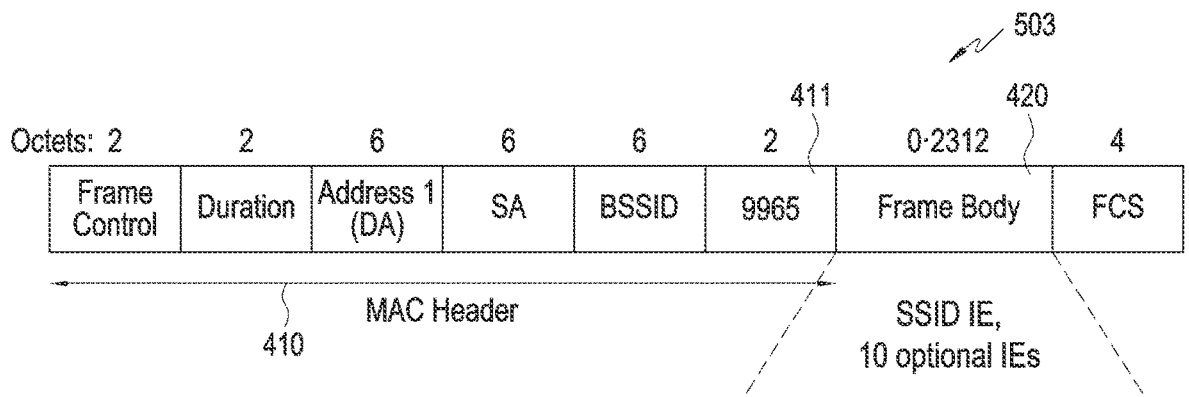
Figure 5C:
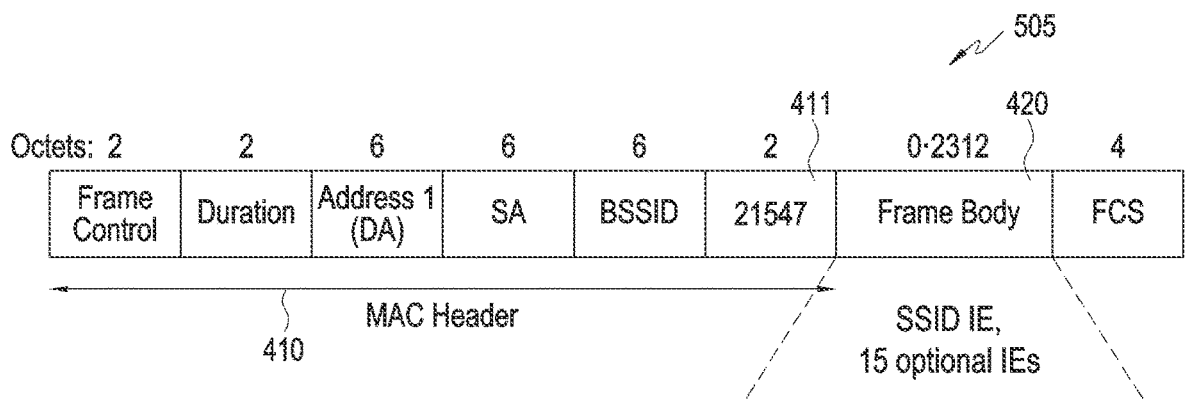

FIGS. 5A, 5B, and 5C illustrate examples of a configuration of a frame according to an embodiment of the disclosure.

Referring to FIGS. 5A, 5B, and 5C, a processor 120 of an electronic device 101 may generate at least one frame (e.g., a probe request frame) for an application having a first application type when the application having the first application type is identified. The processor 120 may configure a sequence control field 411 included in header information (MAC header) 410 with a sequence value randomly selected from among designated random numbers (e.g., 0 to 65536). According to an embodiment, the processor 120 may randomly select IEs to be included in a frame body field 420 from among designated IEs. The processor 120 may randomly select a number of IEs from among the designated IEs, the number being selected from among random numbers (e.g., 0 to 19) indicating the number (e.g., 19) of designated option items of a frame. For example, as the type of the executed application is identified as the first application type, the processor 120 may mandatorily select an optional IE (e.g., an SSID IE) necessary for an association or a disassociation of wireless communication (e.g., Wi-Fi) and randomly select the remaining number of optional IEs. For example, in the SSID IE, an SSID of a Wi-Fi AP (e.g., the AP 301 of FIG. 3), with which a wireless communication association or disassociation is desired, may be configured. For example, in the probe request frame, there may be no mandatory IE and all designated IEs may correspond to optional IEs (e.g., an SSID IE, a request IE, an SSID IE, a supported rate IE, a supported channel IE, and a vender-specific IE (WPS IE or P2P IE), etc.).

According to an embodiment, as shown in FIG. 5A, the processor 120 may configure the sequence control field 411 of the frame (e.g., the probe request frame) with a randomly selected sequence value (e.g., 1). When the number of IEs to be included in the frame body field 420 is selected as, for example, three, the processor 120 may select an optional IE (e.g., SSID IE) related to the purpose of the wireless association or disassociation and randomly select two optional IEs, so as to configure the frame body field 420 by including the selected three optional IEs. The processor 120 may generate a first frame 501 to be transmitted, the first frame including the randomly configured sequence control field 411 and frame body field 420.

According to an embodiment, as shown in FIG. 5B, the processor 120 may configure the sequence control field 411 of the frame (e.g., the probe request frame) with a randomly selected sequence value (e.g., 9965). When the number of IEs to be included in the frame body field 420 is selected as, for example, 10, the processor 120 may select an optional IE (e.g., an SSID IE) related to the purpose of the wireless association or disassociation and randomly select 10 optional IEs, so as to configure the frame body field 420 by including the selected 11 IEs. The processor 120 may generate a second frame 503 to be transmitted, the second frame including the randomly configured sequence control field 411 and frame body field 420.

According to an embodiment, as shown in FIG. 5C, the processor 120 may configure the sequence control field 411 of the frame (e.g., the probe request frame) with a randomly selected sequence value (e.g., 21547). When the number of IEs to be included in the frame body field 420 is selected as, for example, 16, the processor 120 may select an optional IE (e.g., an SSID IE) related to the purpose of the wireless association or disassociation and randomly select 15 optional IEs, so as to configure the frame body field 420 by including the selected 16 IEs. The processor 120 may generate a third frame 505 to be transmitted, the third frame including the randomly configured sequence control field 411 and frame body field 420. For example, the first frame 501, the second frame 503, and the third frame 505 may be sequentially transmitted, and the third frame 505 may be transmitted after a designated time (e.g., a second frame transmission time−a first frame transmission time+a random number) from the transmission of the second frame 503.

The selected number (e.g., 3, 11, and 16) of IEs to be included in the frame body field 420 described in FIGS. 5A, 5B, and 5C above are mere examples provided for convenience of description, and may be randomly selected within a designated random number (e.g., 0 to 19) corresponding to the frame (e.g., the probe request frame).

Figure 6A:
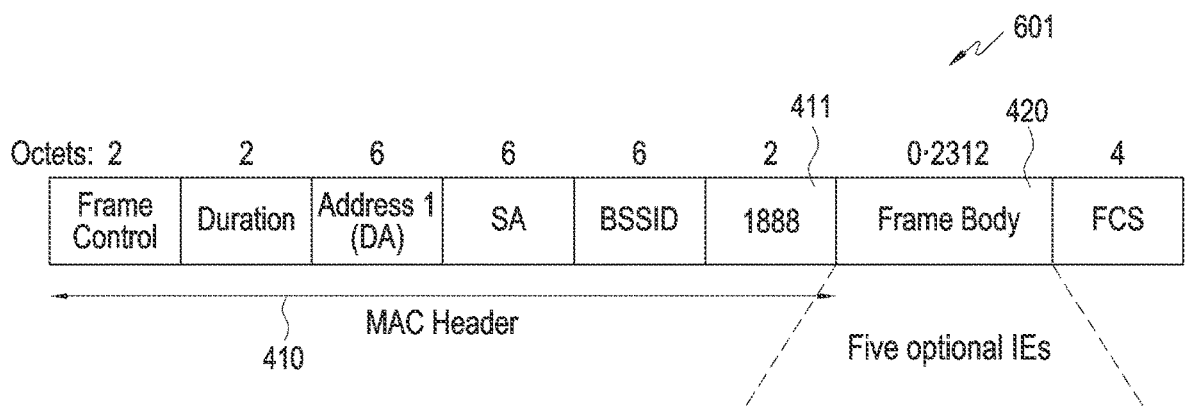
FIGS. 6A, 6B, and 6C illustrate examples of a configuration of a frame according to an embodiment of the disclosure.
Figure 6B:
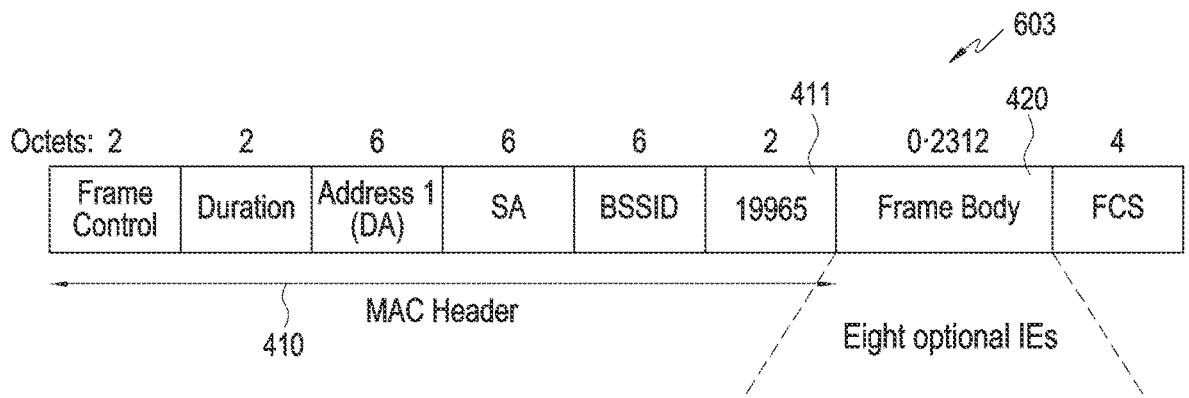
Figure 6C:
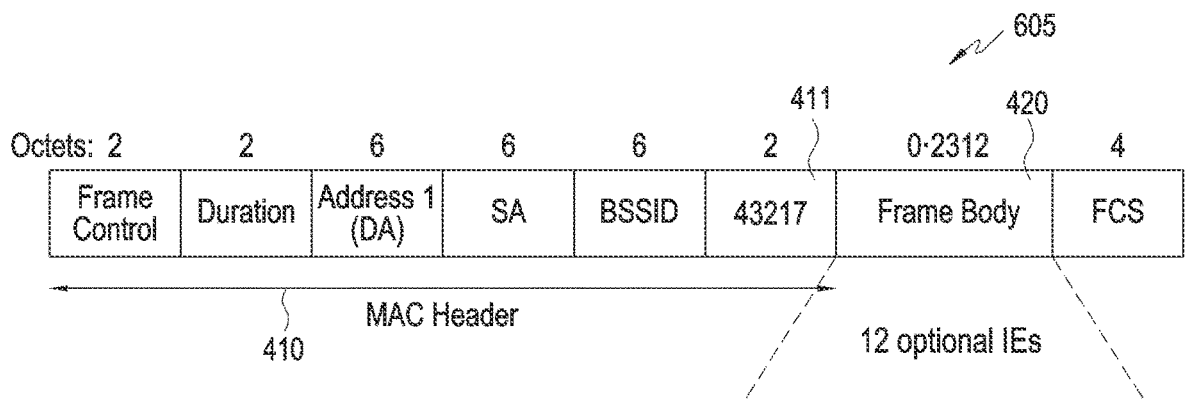

FIGS. 6A, 6B, and 6C illustrate examples of a configuration of a frame according to an embodiment of the disclosure.

Referring to FIGS. 6A, 6B, and 6C, a processor 120 of an electronic device 101 may generate at least one frame (e.g., a probe request frame) for an application having a second application type when the application having the second application type is identified. The processor 120 may configure a sequence control field 411 included in header information (MAC header) 410 with a sequence value selected from among selected random numbers (e.g., 0 to 65536). According to an embodiment, the processor 120 may randomly select IEs to be included in a frame body field 420 from among designated IEs. The processor 120 may randomly select a number of IEs from among the designated IEs, the number being selected from among random numbers (e.g., 0 to 19) indicating the number (e.g., 19) of designated option items of a frame. For example, as there is no purpose of an association or a disassociation of a user and the type of the executed application is identified as the second application type, the processor 120 may not mandatorily select an IE (e.g., an SSID IE) necessary for the purpose of an association or a disassociation of wireless communication (e.g., Wi-Fi), and when the IE is selected, the IE (e.g., the SSID IE) necessary for the purpose of the association or disassociation may include a random value. For example, all of the selected IEs may be configured with a random value. For example, in the probe request frame, all of the designated IEs may correspond to optional IEs.

According to an embodiment, as shown in FIG. 6A, the processor 120 may configure the sequence control field 411 of at least one frame (e.g., the probe request frame) to be transmitted, with a randomly selected sequence value (e.g., 1888). When the number of IEs to be included in the frame body field 420 is selected as, for example, five, the processor 120 may randomly select five optional IEs and configure the frame body field 420 by including the selected five optional IEs. The processor 120 may generate a fourth frame 601 to be transmitted, the fourth frame including the randomly configured sequence control field 411 and frame body field 420. For example, when an IE (e.g., an SSID IE) necessary for the purpose of the association or disassociation is selected in the fourth frame 601, the selected IE may include a random value (e.g., a value of abcde).

According to an embodiment, as shown in FIG. 6B, the processor 120 may configure the sequence control field 411 of at least one frame (e.g., the probe request frame) to be transmitted, with a randomly selected sequence value (e.g., 19965). When the number of IEs to be included in the frame body field 420 is selected as, for example, eight, the processor 120 may randomly select eight optional IEs and configure the frame body field 420 by including the selected five optional IEs. The processor 120 may generate a fifth frame 603 to be transmitted, the fifth frame including the randomly configured sequence control field 411 and frame body field 420. For example, when an IE (e.g., an SSID IE) necessary for the purpose of the association or disassociation is selected in the fifth frame 603, the selected IE may include a random value (e.g., a value of 154687).

According to an embodiment, as shown in FIG. 6C, the processor 120 may configure the sequence control field 411 of at least one frame (e.g., the probe request frame) to be transmitted, with a randomly selected sequence value (e.g., 43217). When the number of IEs to be included in the frame body field 420 is selected as, for example, 12, the processor 120 may select 12 optional IEs and configure the frame body field 420 by including the selected 12 optional IEs. The processor 120 may generate a sixth frame 605 to be transmitted, the sixth frame including the randomly configured sequence control field 411 and frame body field 420. For example, when an IE (e.g., an SSID IE) necessary for the purpose of the association or disassociation is selected in the sixth frame 605, the selected IE may include a random value (e.g., a value of a32323bcde). For example, the fourth frame 601, the fifth frame 603, and the sixth frame 605 may be sequentially transmitted, and the sixth frame 605 may be transmitted after a designated time (e.g., a fifth frame transmission time−a fourth frame transmission time+a random number) from the transmission of the fifth frame 603.

The selected number (e.g., 5, 8, and 12) of IEs to be included in the frame body field 420 described in FIGS. 6A, 6B, and 6B above are mere examples provided for convenience of description, and may be randomly selected within a designated random number (e.g., 0 to 19) corresponding to the frame (e.g., the probe request frame).

Figure 7A:
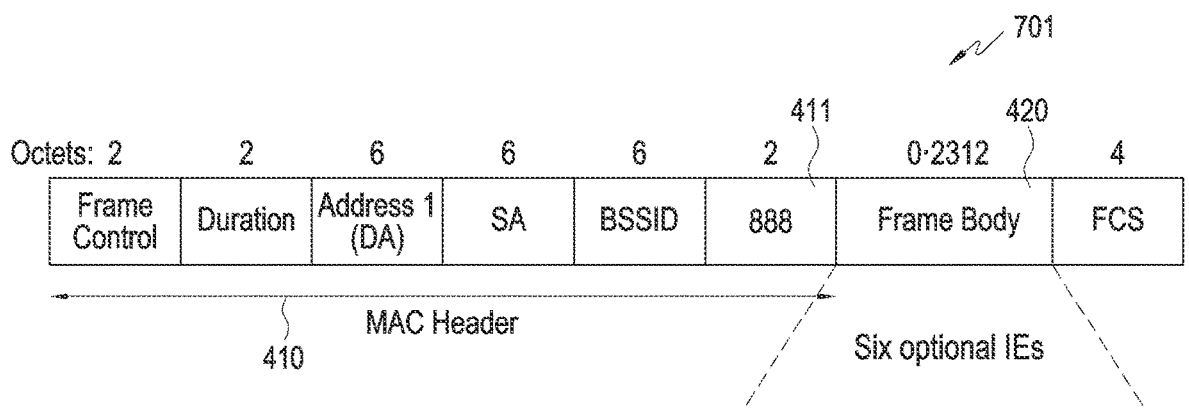
FIGS. 7A, 7B, and 7C illustrate examples of a configuration of a frame according to an embodiment of the disclosure.
Figure 7B:
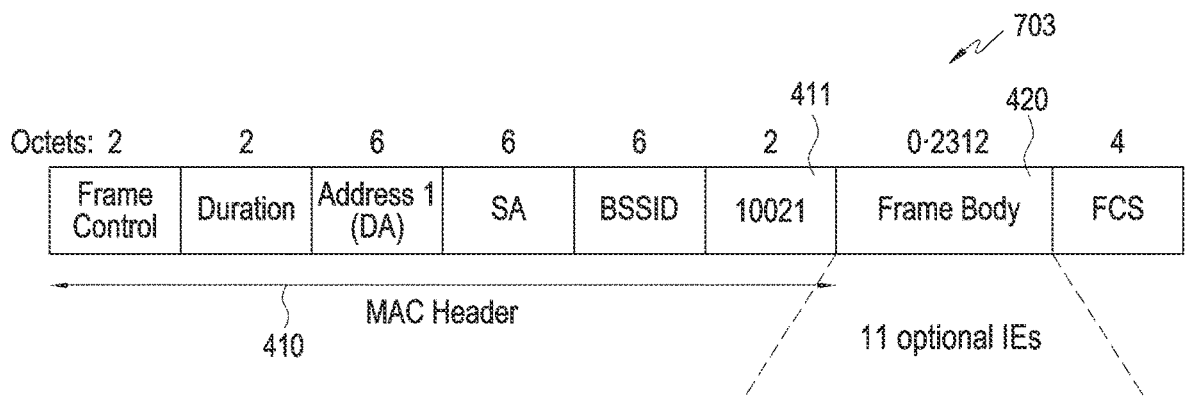
Figure 7C:
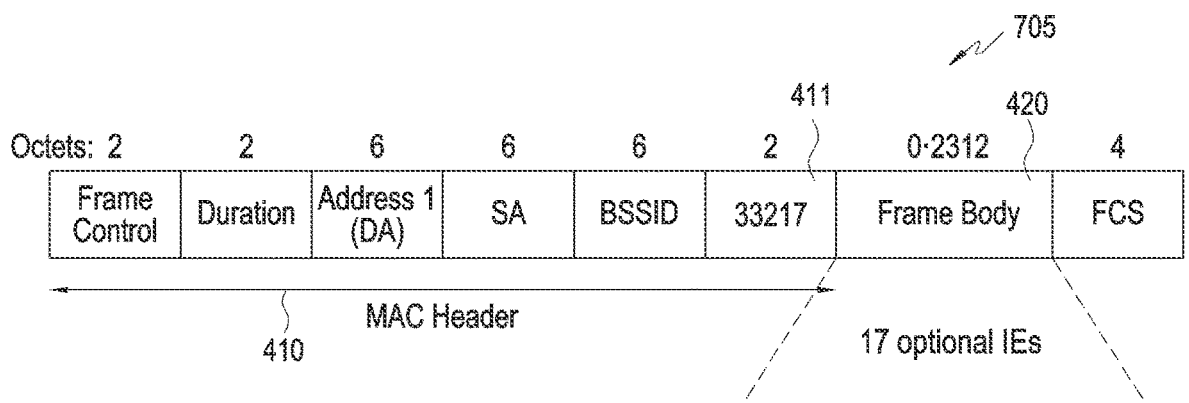

FIGS. 7A, 7B, and 7C illustrate examples of a configuration of a frame according to an embodiment of the disclosure.

Referring to FIGS. 7A, 7B, and 7C, a processor 120 of an electronic device 101 may generate at least one frame (e.g., a probe request frame) for an application having a third application type when the application having the third application type is identified. The processor 120 may configure a sequence control field 411 included in header information (MAC header) 410 with a sequence value selected from among selected random numbers (e.g., 0 to 65536). According to an embodiment, the processor 120 may randomly select IEs to be included in a frame body field 420 from among designated IEs. The processor 120 may randomly select a number of IEs from among the designated IEs, the number being selected from among random numbers (e.g., 0 to 19) indicating the number (e.g., 19) of designated option items of a frame. For example, as there is no purpose of an association or a disassociation of a user and the type of the executed application is identified as the third application type, the processor 120 may not mandatorily select an optional IE (e.g., an SSID IE) necessary for the purpose of an association or a disassociation of wireless communication (e.g., Wi-Fi), and when the IE is selected, the optional IE (e.g., the SSID IE) necessary for the purpose of the association or disassociation may include a random value. For example, all of the selected IEs may be configured with a random value. For example, in the probe request frame, all of the designated IEs may correspond to optional IEs.

According to an embodiment, as shown in FIG. 7A, the processor 120 may configure the sequence control field 411 of the frame (e.g., the probe request frame) with a randomly selected sequence value (e.g., 888). When the number of IEs to be included in the frame body field 420 is selected as, for example, six, the processor 120 may randomly select six optional IEs and configure the frame body field 420 by including the selected six optional IEs. The processor 120 may generate a seventh frame 701 to be transmitted, the seventh frame including the randomly configured sequence control field 411 and frame body field 420. For example, when an IE (e.g., an SSID IE) necessary for the purpose of the association or disassociation is selected in the seventh frame 701, the selected SSID IE may include a random value (e.g., a value of abcde).

According to an embodiment, as shown in FIG. 7B, the processor 120 may configure the sequence control field 411 of at least one frame (e.g., the probe request frame) to be transmitted, with a randomly selected sequence value (e.g., 10021). When the number of IEs to be included in the frame body field 420 is selected as, for example, 11, the processor 120 may randomly select 11 optional IEs and configure the frame body field 420 by including the selected 11 optional IEs. The processor 120 may generate an eighth frame 703 to be transmitted, the eighth frame including the randomly configured sequence control field 411 and frame body field 420. For example, when an IE (e.g., an SSID IE) necessary for the purpose of the association or disassociation is selected in the eighth frame 703, the selected SSID IE may include a random value (e.g., a value of 154687).

According to an embodiment, as shown in FIG. 7C, the processor 120 may configure the sequence control field 411 of at least one frame (e.g., the probe request frame) to be transmitted, with a randomly selected sequence value (e.g., 33217). When the number of IEs to be included in the frame body field 420 is selected as, for example, 17, the processor 120 may select 17 optional IEs and configure the frame body field 420 by including the selected 17 optional IEs. The processor 120 may generate a ninth frame 705 to be transmitted, the ninth frame including the randomly configured sequence control field 411 and frame body field 420. For example, when an IE (e.g., an SSID IE) necessary for the purpose of the association or disassociation is selected in the ninth frame 705, the selected IE may include a random value (e.g., a value of a32323bcde). For example, the seventh frame 701, the eighth frame 703, and the ninth frame 705 may be sequentially transmitted, and the ninth frame 705 may be transmitted after a designated time (e.g., an eighth frame transmission time–a seventh frame transmission time+a random number) from the transmission of the eighth frame 703.

The selected number (e.g., 6, 11, and 17) of IEs to be included in the frame body field 420 described in FIGS. 7A, 7B, and 7C above are mere examples provided for convenience of description, and may be randomly selected within a designated random number (e.g., 0 to 19) corresponding to the frame (e.g., the probe request frame).

At least one frame to be transmitted is described in FIGS. 5A to 7C above with an example of, but not limited to, a probe request frame, and as described in connection with FIGS. 5A to 7C, also for an authentication request frame or an association request frame, the frame body field 420 may be configured with randomly selected IEs to be included in the frame body field 420 and a sequence value to be included in the sequence control field 411 may be randomly configured, such that one or more different may be generated for each application type. For example, for the authentication request frame, as IEs to be included in the frame body field 420, two mandatory IEs may be mandatorily selected, and a number of optional IEs may be randomly selected, the number corresponding to the number of IEs selected from among a designated number of multiple optional IEs (e.g., 17 optional IEs). For example, for the association request frame, as IEs to be included in the frame body field 420, three mandatory IEs may be mandatorily selected, and a number of optional IEs may be randomly selected, the number corresponding to the number of IEs selected from among a designated number of multiple optional IEs (e.g., 23 optional IEs).

According to an embodiment, the processor 120 may not randomly configure the sequence control field 411 and randomly configure the frame body field 420 only, so as to generate at least one frame to be transmitted.

According to an embodiment, the processor 120 may configure a frame body field by configuring different combinations of IEs randomly selected based on at least one of the IE type or the IE number, such that one or more different frames are generated for each type of a management frame (e.g., a probe request frame, an authentication request frame, or an association request frame).

According to an embodiment, as shown in FIGS. 5A to 9, the processor 120 may randomly configure the sequence control field 411 and the frame body field 420, and also randomly configure an address information field included in the header information 410. The processor 120 may generate at least one frame including a frame body field, a sequence control field, and an address information field which are all randomly configured.

Figure 8:
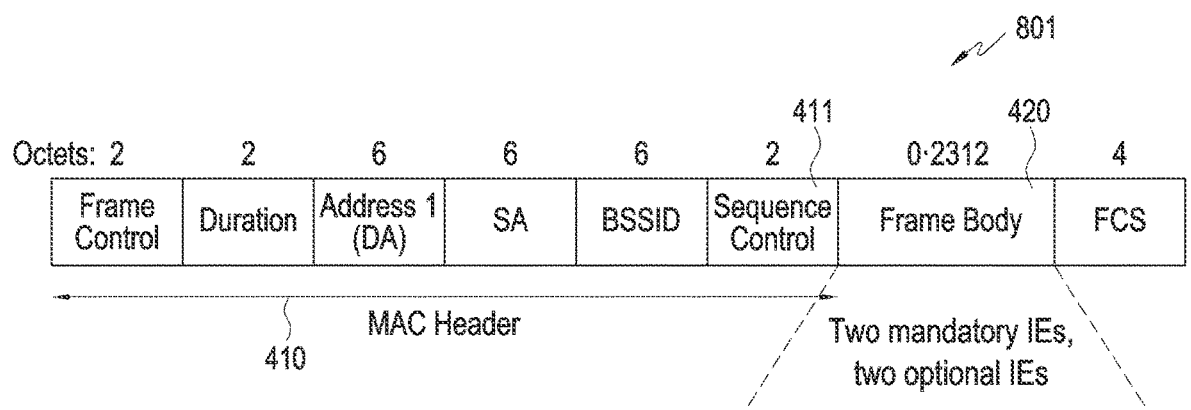
FIG. 8 illustrates an example of a configuration of a frame according to an embodiment of the disclosure.

FIG. 8 illustrates an example of a configuration of a frame according to an embodiment of the disclosure.

Referring to FIG. 8, when the type of a frame to be transmitted through wireless communication corresponds to an authentication request frame, a processor 120 of an electronic device 101 may mandatorily select two mandatory IEs (e.g., an authentication algorithm number IE and an authentication transaction sequence number IE) necessary for authentication, and randomly select at least one optional IE (e.g., two optional IEs) from among predesignated optional IEs (e.g., 17). The processor 120 may generate a frame 801 by including a mandatory IE (e.g., two IEs) and selected optional IEs (e.g., two IEs). When an authentication operation is repeatedly performed, the processor 120 may randomly select different numbers of optional IEs from among pre-designated optional IEs (e.g., 17) and generate multiple different authentication request frames. The mandatory IE number and the selected optional IE number are not limited to the numbers described in FIGS. 7A, 7B, and 7C, and the mandatory IE number may be designated with other numbers, and the selected optional IE number may be selected as a random number from among the pre-designated optional IE number (e.g., 17).

Figure 9:
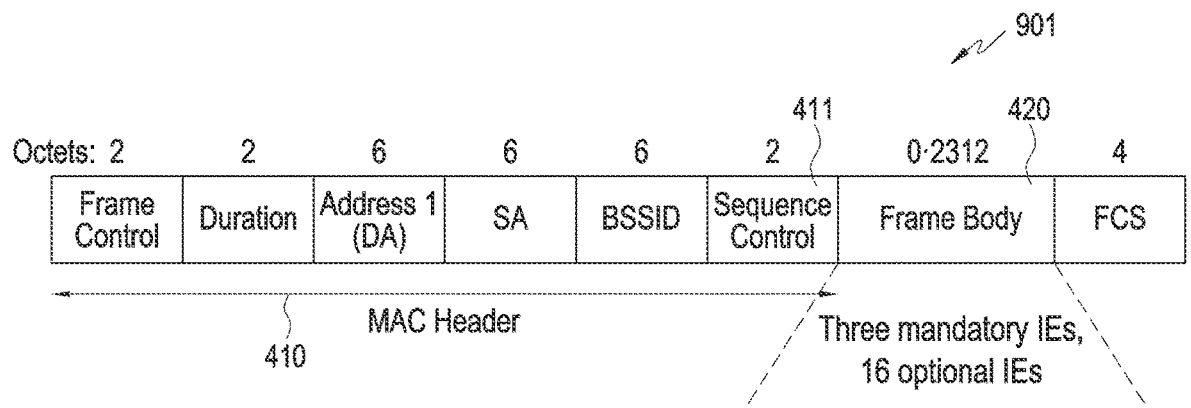
FIG. 9 illustrates an example of a configuration of a frame according to an embodiment of the disclosure.

FIG. 9 illustrates an example of a configuration of a frame according to an embodiment of the disclosure.

Referring to FIG. 9, when the type of a wireless communication application frame to be transmitted corresponding to the first application type corresponds to an association request frame, a processor 120 of an electronic device 101 may, for example, mandatorily select mandatory IEs (e.g., capability information, listen interval, and SSID IEs) necessary for an association and randomly select at least one optional IE from among pre-designated optional IEs (e.g., 23 IEs). The processor 120 may generate a frame 901 by including the mandatory IEs (e.g., three IEs) and selected optional IEs (e.g., 16 IEs). When the association operation is repeatedly performed, the processor 120 may generate multiple different authentication request frames by randomly selecting different numbers of optional IEs from among pre-designated optional IEs (e.g., 23 IEs). The mandatory IE number and the selected optional IE number are not limited to the numbers described in FIG. 8, and the mandatory IE number may be designated with other numbers, and the selected optional IE number may be selected as a random number from among the pre-designated optional IE number (e.g., 17). For example, different numbers of IEs may be designated to the probe request frame, the authentication request frame, and the association request frame of a wireless communication application having the first application type, and some of the designated IEs may be identical.

The frame 401 described above with reference to FIGS. 5A to 9 is may include header information 410 (e.g., a media access control (MAC) header), a frame body field 420, and an error detection field (a frame check sequence (FCS)) part. The header information 410 may include a frame control field, a duration field, address information fields (DA, SA, and/or basic service set identifier (BSSID)), and a sequence control field 411.

According to an embodiment, the processor 120 may randomly configure at least one of the sequence control field 411, the frame body field 420, or the address information field of the frame 401 for each of frame type according to the application type, such that one or more different frames are generated for each type of the management frame (e.g., the probe request frame, the authentication request frame, or the association request frame). For example, in a case of an application not necessarily requiring a fixed value for the address information field, the processor 120 may also randomly configure the address information field. For example, as shown in FIGS. 5A to 7C, for the probe request frame, both the sequence control field 411 and the frame body field 420 may be randomly configured, and as shown in FIGS. 8 and 9, for the authentication request frame and the association request frame, only the frame body field 420 may be randomly configured. According to the application type, for the probe request frame, all of the sequence control field 411, the frame body field 420, and the address information field may be randomly configured. In another example, for all of the probe request frame, the authentication request frame, and the association request frame, only the frame body field 420 may be randomly configured. Each of the probe request frame, the authentication request frame, and the association request frame may include, in the frame body field 420, IE combinations made in different manners based on at least one of the IE type or the IE number.

According to an embodiment, when requiring at least one frame generated for each application type, the processor 120 may perform transmission at a specific location or aperiodically perform transmission at a designated time point. According to an embodiment, the processor 120 may remove information of fields or IEs indicating device information of the electronic device 101 from the probe request frame for each type, or may configure information of fields or IEs indicating device information of the electronic device 101 with a random value in the probe request frame for each type.

According to an embodiment, the processor 120 may reset the sequence control field 411 in the wireless communication frame 401 according to a user's status. For example, when at least one of a status in which a user moves a specific distance or more, a status in which a specific time has passed, or a status related to the user's current wireless communication (e.g., a Wi-Fi connected/disconnected/on/off status, app usage, etc.) occurs, the processor 120 may reset the sequence control field 411.

According to an embodiment, an electronic device (e.g., the electronic device 101 of FIGS. 1 and 2) may include a communication module (e.g., the communication module 190 of FIG. 1 and the wireless communication module 203 of FIG. 2), a memory (e.g., the memory of FIG. 1) and at least one processor (e.g., the processor of FIG. 1), wherein the at least one processor is configured to identify a type of at least one executed application, randomly select at least one information element to be included in a frame for wireless communication for the at least one executed application, based on the identified type, generate at least one frame including the at least one selected information element, and control the communication module to transmit the at least one generated frame through the wireless communication.

According to an embodiment, the at least one processor may be further configured to randomly select a sequence value to be configured in a sequence control field included in header information of the at least one frame.

According to an embodiment, the at least one generated frame, as a management frame, may correspond to at least one of a probe request frame, an authentication request frame, or an association request frame. The at least one selected information element may be included in a frame body field of the at least one frame.

According to an embodiment, the at least one processor may be configured to classify and group the at least one executed application according to a type, based on at least one of a purpose of an association or a disassociation of a user or a purpose of location identification.

According to an embodiment, the at least one processor may be configured to randomly configure an address information field and a sequence control field included in header information of the at least one frame, and generate the at least one frame including the address information field, the sequence control field, and a frame body field including the at least one selected information element.

According to an embodiment, the at least one processor may be configured to randomly select the at least one information element, based on at least one of a type of an information element or a number of information elements.

According to an embodiment, the at least one processor may be configured to, when the type of the at least one executed application is identified as a first type having a purpose of an association or a disassociation of a user, select an information element of network address information necessary for the wireless communication and randomly select at least one optional information element from among designated optional information elements.

According to an embodiment, the at least one processor may be configured to, when the type of the at least one executed application is identified as a second type having no purpose of an association or a disassociation of a user and having a purpose of location identification, randomly select at least one optional information element (IE) from among designated optional information elements. The at least one selected optional IE may be configured with a random value.

According to an embodiment, the at least one processor may be configured to, when the type of the at least one executed application is identified as a third type having neither a purpose of an association or a disassociation of a user nor a purpose of location identification, randomly select at least one optional information element from among designated optional information elements. An information element combination including the at least one selected optional information element for the third type is different from combinations including those for other types, based on at least one of a type of the information element and a number of information elements.

According to an embodiment, the wireless communication corresponds to wireless communication in a Wi-Fi communication scheme.

Hereinafter, an operation method of an electronic device will be described with reference to the above-described drawings.

Figure 10:
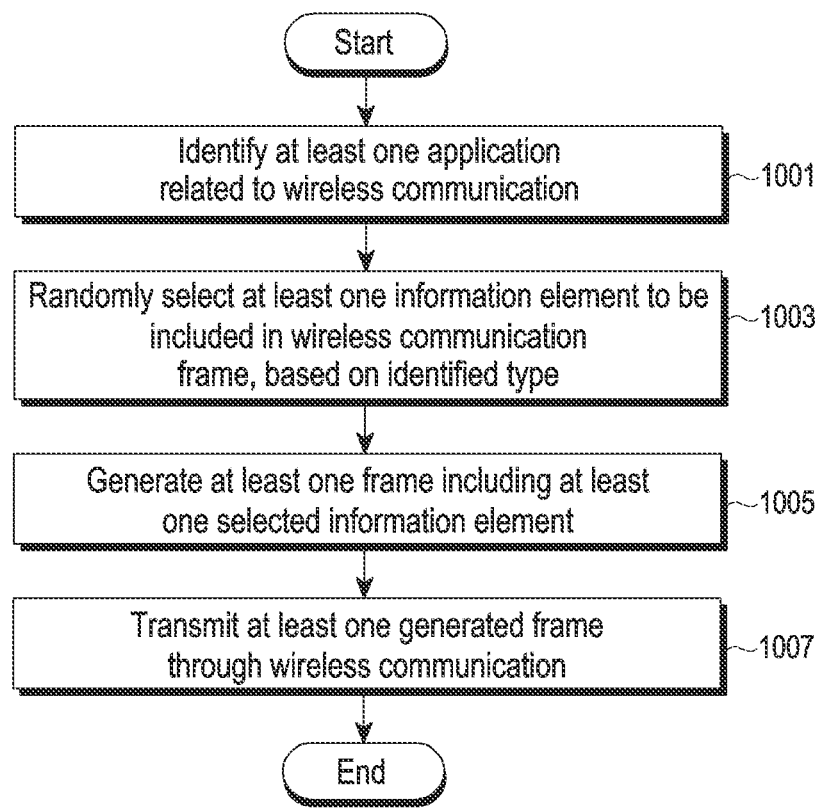
FIG. 10 illustrates an example of an operation method of an electronic device according to an embodiment of the disclosure.

FIG. 10 illustrates an example of an operation method of an electronic device according to an embodiment of the disclosure.

Referring to FIG. 10, in operation 1001, an electronic device (e.g., the electronic device 101 of FIGS. 1 and 2) according to an embodiment may identify at least one executed application among applications included in groups of the application 230 of the software module 201. The identified at least one executed application may be related to wireless communication.

In operation 1003, the electronic device may identify the type of the at least one identified application and randomly select at least one information element to be included in at least one frame for wireless communication, based on the identified type.

In operation 1005, the electronic device may generate at least one frame including the at least one selected information element. The electronic device may include the at least one selected information element in a frame body field (e.g., the frame body field 420 of FIG. 4) of the at least one frame. For example, the electronic device may randomly configure the frame body field of the frame and randomly configure a sequence control field (e.g., the sequence control field 411 of FIG. 4) included in header information of the frame with a random sequence value, so as to generate at least one frame. For example, as shown in FIGS. 5A to 7C, when multiple frames are generated, the electronic device may configure different types and/or numbers of IEs to be included in multiple frames, respectively, to generate multiple different frames. For example, as described in FIGS. 8 and 9, the electronic device may generate at least one frame for each frame type.

In operation 1007, the electronic device may transmit the at least one generated frame to an external device (e.g., the AP 301 of FIG. 3) through wireless communication. For example, when multiple frames are generated, the electronic device may sequentially transmit the multiple frames.

Figure 11:
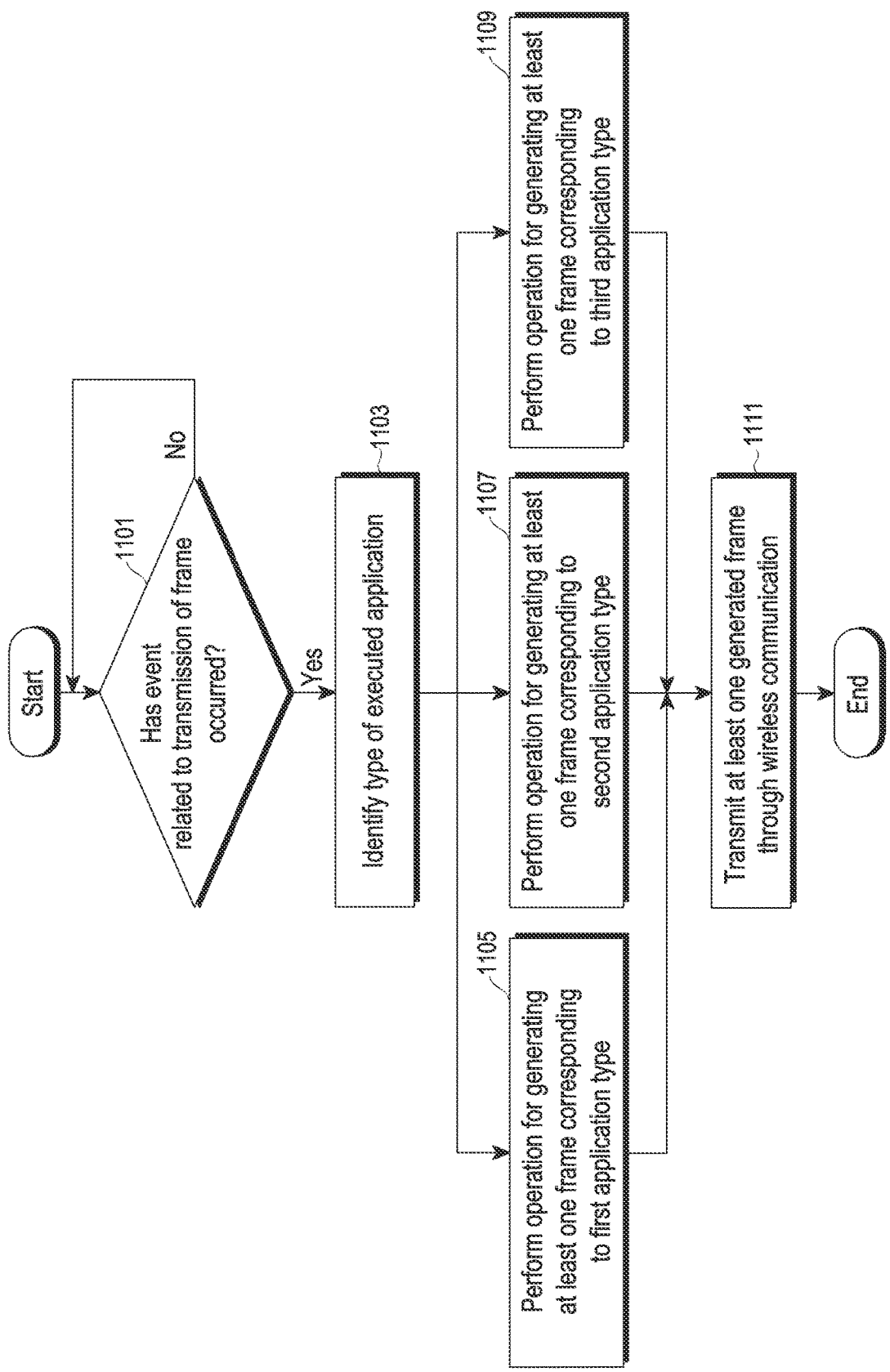
FIG. 11 illustrates an example of an operation method of an electronic device according to an embodiment of the disclosure.

FIG. 11 illustrates an example of an operation method of an electronic device according to an embodiment of the disclosure.

Referring to FIG. 11, in operation 1101, an electronic device (e.g., the electronic device 101 of FIGS. 1 and 2) according to an embodiment may identify whether an event related to transmission of a frame (e.g., a management frame) for wireless communication has occurred in an executed application among applications included in groups of the application 230 of the software module 201. The event, as an event indicating a situation requiring transmission of the frame, may correspond to an event occurring according to a situation in which a direct wireless communication (e.g., Wi-Fi) association or disassociation is required by a user, a situation in which wireless communication (e.g., Wi-Fi) is turned on upon a location identification request, or a situation in which the wireless communication (e.g., Wi-Fi) is turned on regardless of the direct wireless communication (e.g., Wi-Fi) association or disassociation request or the location identification request. If the event has occurred in operation 1101, the electronic device performs operation 1103, and if not, the electronic device may continuously perform operation 1101.

In operation 1103, the electronic device may identify the type of the executed application. Thereafter, the electronic device may perform operations for generating different frames for each identified type of the application.

In operation 1105, when the type of the executed application corresponds to a first application type, the electronic device may perform an operation for generating at least one frame corresponding to the identified first application type. For example, the application having the first application type may correspond to an application (e.g., the first group application 231 of FIG. 2) executed with the purpose of the direct wireless communication (e.g., Wi-Fi) association or disassociation by the user.

In operation 1107, when the type of the executed application corresponds to a second application type, the electronic device may perform operations for generating at least one frame corresponding to the identified second application type. For example, the application having the second application type may correspond to a location-related application (e.g., the second group application 233 of FIG. 2) with the purpose of the location identification and without the purpose of the direct wireless communication (e.g., Wi-Fi) association or disassociation by the user.

In operation 1109, when the type of the executed application corresponds to a third application type, the electronic device may perform operations for generating at least one frame corresponding to the identified third application type. For example, the application having the third application type may correspond to another application (e.g., the third group application 235 of FIG. 2) with neither the purpose of the direct wireless communication (e.g., Wi-Fi) association or disassociation by the user nor the purpose of the location identification.

In operation 1111, the electronic device may transmit, to the external electronic device (e.g., the AP 301 of FIG. 3) through wireless communication (e.g., Wi-Fi), the at least one frame generated in different manners for each identified type of the application.

According to an embodiment, in operations 1105, 1107, and 1109, when generating the at least one frame, the electronic device may identify the type of the frame to be generated and identify a mandatory IE or an IE to be mandatorily selected for the identified type of the frame. The mandatory IE may be pre-designated in different manners for each frame type. The electronic device may configure different types or numbers of IEs (e.g., mandatory IE and/or optional IE) for each frame type. The electronic device may randomly select at least one optional IE for each frame type, and generate a frame including the at least one selected optional IE and the mandatory IE or the IE to be mandatorily selected.

According to an embodiment, in operation 1105 above, for example, when the type of a frame to be transmitted of a wireless communication application corresponding to the first application type corresponds to a probe request frame by a scanning operation, the electronic device may, as shown in FIGS. 5A, 5B, and 5C, mandatorily select an SSID IE necessary for AP scanning from among designated optional IEs (e.g., 19 IEs), and randomly select the types and the number of the optional IEs (mandatory IE and/or optional IE). The electronic device may generate a frame by including the selected SSID IE and optional IEs in a frame body field of the frame. When the probe request frame is periodically or aperiodically transmitted, the electronic device may generate multiple probe request frames including different numbers of selected optional IEs. The electronic device may select different numbers of selected optional IEs and also randomly configure a sequence value of a sequence control field included in header information of the frame, so as to generate multiple different probe request frames. For example, the electronic device may include the same type and the same number of selected optional IEs and configure different sequence values to generate multiple different probe request frames. In another example, in operation 1105 above, when the type of the frame to be transmitted of the wireless communication application corresponding to the first application type corresponds to an authentication request frame, the electronic device may mandatorily select mandatory IEs (e.g., an authentication algorithm number IE and an authentication transaction sequence number IE) necessary for authentication and randomly select optional IEs from among pre-designated optional IEs (e.g., 17 IEs). When the authentication operation is repeatedly performed, the electronic device may randomly select at least one optional IE from among different numbers of pre-designated optional IEs (e.g., 17 IEs) to generate multiple different authentication request frames. In another example, in operation 1105 above, when the type of the frame to be transmitted of the wireless communication application corresponding to the first application type corresponds to an association request frame, the electronic device may mandatorily select mandatory IEs (e.g., capability information, listen interval, and SSID IEs) necessary for the association, and randomly select at least one optional IE from among pre-designated optional IEs (e.g., 23 IEs). When the association operation is repeatedly performed, the electronic device may randomly select different numbers of optional IEs from among pre-designated optional IEs (e.g., 23 IEs) to generate multiple different association request frames. Different numbers of IEs may be designated to the probe request frame, the authentication request frame, and the association request frame of the wireless communication application having the first application type, and some of the designated IEs may be identical.

According to an embodiment, in operation 1107 above, when the electronic device switches on the wireless communication (e.g., Wi-Fi) upon the execution of the location-related application corresponding to the second application type, and when the wireless communication (e.g., Wi-Fi) is turned on, the electronic device may randomly select the types and the number of IEs from among designated optional IEs (e.g., 19 IEs). The electronic device may generate a frame to be transmitted while the selected optional IEs are included in a frame body field of the frame. When the frame is periodically or aperiodically transmitted, the electronic device may generate multiple frames including different numbers of selected optional IEs. The electronic device may select different numbers of selected optional IEs and also randomly configure a sequence value of a sequence control field included in header information of the frame, so as to generate multiple different probe request frames. For example, unlike the frame for the first application type, the frame for the second application type may not include the SSID IE, and when the SSID IE is included, the electronic device may configure the SSID IE with a random value, and configure random values for all of the selected optional IEs. In another example, when both the sequence field and the frame body field are randomly configured for the frame for the first application type, unlike the first application type, the electronic device may randomly configure only the frame body field for the frame for the second application type.

According to an embodiment, in operation 1109 above, the electronic device may switch on the wireless communication (e.g., Wi-Fi) upon the execution of another application corresponding to the third application type, and when the wireless communication (e.g., Wi-Fi) is turned on, the electronic device may randomly select the IE type and number from among designated optional IEs (e.g., 19 IEs). The electronic device may generate a frame to be transmitted while the selected optional IEs are included in a frame body field of the frame. When the frame is repeatedly transmitted, the electronic device may generate multiple frames including different numbers of selected optional IEs. The electronic device may select different numbers of selected optional IEs and also randomly configure a sequence value of a sequence control field included in header information of the frame, so as to generate multiple different probe request frames. For example, unlike the frame for the first application type, the frame for the third application type may not include the SSID IE, when the SSID IE is included, the electronic device may configure the SSID IE with a random value, and unlike the frame for the second application type, the frame for the third application type may not configure random values for the selected optional IEs. In another example, when both the sequence field and the frame body field are randomly configured for the frame for the first application type and/or the second application type, unlike the first application type and/or the second application type, the electronic device may randomly configure only the frame body field for the frame for the third application type.

According to an embodiment, a method performed by an electronic device (e.g., the electronic device 101 of FIGS. 1 and 2) may include identifying a type of at least one executed application, randomly selecting at least one information element to be included in a frame for wireless communication for the at least one executed application, based on the identified type, generating at least one frame including the at least one selected information element, and transmitting the at least one generated frame through the wireless communication.

According to an embodiment, the method may further include randomly selecting a sequence value to be configured in a sequence control field included in header information of the at least one frame.

According to an embodiment, the at least one generated frame, as a management frame, may correspond to at least one of a probe request frame, an authentication request frame, or an association request frame, and the at least one selected information element may be included in a frame body field of the at least one frame.

According to an embodiment, the method may further include classifying and grouping the at least one executed application according to a type, based on at least one of a purpose of an association or a disassociation of a user or a purpose of location identification.

According to an embodiment, the method may further include randomly configuring an address information field and a sequence control field included in header information of the at least one frame. The generating of the at least one frame may include generating the at least one frame including the address information field, the sequence control field, and a frame body field including the at least one selected information element.

According to an embodiment, the randomly selecting of the at least one information element may further include randomly selecting the at least one information element, based on at least one of a type of an information element or a number of information elements.

According to an embodiment, the randomly selecting of the at least one information element may include, when the type of the at least one executed application is identified as a first type having a purpose of an association or a disassociation of a user, selecting an information element of network address information necessary for the wireless communication, and randomly selecting at least one optional information element from among designated optional information elements.

According to an embodiment, the randomly selecting of the at least one information element may include, when the type of the at least one executed application is identified as a second type having no purpose of an association or a disassociation of a user and having a purpose of location identification, randomly selecting at least one optional information element (IE) from among designated optional information elements. The at least one selected optional IE may be configured with a random value.

According to an embodiment, the randomly selecting of the at least one information element may include, when the type of the at least one executed application is identified as a third type having neither a purpose of an association or a disassociation of a user nor a purpose of location identification, randomly selecting at least one optional information element from among designated optional information elements, and an information element combination including the at least one selected option information element for the third type may is different from combinations including those for other types, based on at least one of a type of the information element and a number of information elements.

According to an embodiment, in a non-transitory storage medium configured to store a program, the program may include executable instructions which, when executed by a processor of an electronic device, causes the processor to identify a type of at least one executed application, randomly select at least one information element to be included in a frame for wireless communication for the at least one executed application, based on the identified type, generate at least one frame including the at least one selected information element, and transmit the at least one generated frame through the wireless communication.

Further, the embodiments disclosed herein have been presented to explain the technical contents of the disclosure and help the understanding thereof, and are not intended to limit the scope of the technology disclosed herein. Therefore, the scope of the disclosure should be construed to cover all changes and modifications or various other embodiments based on the technical idea of the disclosure.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
communication circuitry;
memory; and
at least one processor electrically connected to the communication circuitry and the memory,
wherein the at least one processor is configured to:
identify an application type of at least one executed application,
select a random number of information elements for the application type from among designated random numbers,
randomly select at least one information element to be included in a frame for wireless communication for the at least one executed application,
based on the selected random number of information elements, set a frame body field including the at least one selected information element,
generate at least one frame including the frame body field, and control the communication circuitry to transmit the at least one generated frame through the wireless communication, wherein the frame body field consists of a combination of at least one information element, the combination of the at least one information element including the at least one selected information element, and wherein a frame body field of an application is changed according to an application type of the application.

2. The electronic device of claim 1, wherein the at least one processor is further configured to randomly select a sequence value to be configured in a sequence control field included in header information of the at least one frame.

3. The electronic device of claim 1, wherein the at least one generated frame, as a management frame, corresponds to at least one of a probe request frame, an authentication request frame, or an association request frame.

4. The electronic device of claim 1, wherein the at least one processor is further configured to classify and group the at least one executed application according to the application type, based on at least one of a purpose of an association or a disassociation of a user, or a purpose of location identification.

5. The electronic device of claim 1, wherein the at least one processor is further configured to:
randomly configure an address information field and a sequence control field included in header information of the at least one frame; and
generate the at least one frame comprising the address information field, the sequence control field, and the frame body field comprising the at least one selected information element.

6. The electronic device of claim 1, wherein the at least one processor is further configured to randomly select the at least one information element, based on at least one of types of information elements.

7. The electronic device of claim 1, wherein the at least one processor is further configured to, when the application type of the at least one executed application is identified as a first type having a purpose of an association or a disassociation of a user, select an information element of network address information necessary for the wireless communication and randomly select at least one optional information element from among designated optional information elements.

8. The electronic device of claim 1,
wherein the at least one processor is further configured to, when the application type of the at least one executed application is identified as a second type having no purpose of an association or a disassociation of a user and having a purpose of location identification, randomly select at least one optional information element (IE) from among designated optional information elements, and
wherein the at least one selected optional IE is configured with a random value.

9. The electronic device of claim 1,
wherein the at least one processor is further configured to, when the application type of the at least one executed application is identified as a third type having neither a purpose of an association or a disassociation of a user nor a purpose of location identification, randomly select at least one optional information element from among designated optional information elements, and
wherein an information element combination comprising the at least one selected optional information element for the third type is different from combinations comprising those for other types, based on at least one of a type of at least one selected option information element and a number of at least one selected option information element.

10. The electronic device of claim 1, wherein the wireless communication corresponds to wireless communication in a wireless-fidelity (Wi-Fi) communication scheme.

11. The electronic device of claim 1, wherein the at least one processor is further configured to identify the application type of the at least one executed application in response to detection that transmission of the frame through the wireless communication for the at least one executed application is to occur.

12. A method performed by an electronic device, the method comprising:
identifying an application type of at least one executed application;
selecting a random number of information elements for the identified application type from among designated random numbers;
randomly selecting at least one information element to be included in a frame for wireless communication for the at least one executed application;
based on the selected random number of information elements, setting a frame body field including at least one frame comprising the at least one selected information element;
generating at least one frame including the frame body field; and
transmitting the at least one generated frame through the wireless communication,
wherein the frame body field consists of a combination of at least one information element, the combination of the at least one information element including the at least one selected information element, and
wherein a frame body field of an application is changed according to an application type of the application.

13. The method of claim 12, further comprising:
randomly selecting a sequence value to be configured in a sequence control field included in header information of the at least one frame.

14. The method of claim 12, wherein the at least one generated frame, as a management frame, corresponds to at least one of a probe request frame, an authentication request frame, or an association request frame.

15. The method of claim 12, further comprising:
classifying and grouping the at least one executed application according to the application type, based on at least one of a purpose of an association or a disassociation of a user or a purpose of location identification.

16. The method of claim 12, further comprising:
randomly configuring an address information field and a sequence control field included in header information of the at least one frame,
wherein the generating of the at least one frame comprises generating the at least one frame comprising the address information field, the sequence control field, and the frame body field comprising the at least one selected information element.

17. The method of claim 12, wherein the randomly selecting of the at least one information element comprises randomly selecting the at least one information element, based on at least one of the types of information elements.

18. The method of claim 12, wherein the randomly selecting of the at least one information element comprises, when the application type of the at least one executed application is identified as a first type having a purpose of an association or a disassociation of a user, selecting an information element of network address information necessary for the wireless communication, and randomly selecting at least one optional information element from among designated optional information elements.

19. The method of claim 12,
wherein the randomly selecting of the at least one information element comprises, when the application type of the at least one executed application is identified as a second type having no purpose of an association or a disassociation of a user and having a purpose of location identification, randomly selecting at least one optional information element (IE) from among designated optional information elements, and
wherein the at least one selected optional IE is configured with a random value.

20. The method of claim 12,
wherein the randomly selecting of the at least one information element comprises, when the application type of the at least one executed application is identified as a third type having neither a purpose of an association or a disassociation of a user nor a purpose of location identification, randomly selecting at least one optional information element from among designated optional information elements, and
wherein an information element combination comprising the at least one selected option information element for the third type is different from combinations comprising those for other types, based on at least one of a type of the at least one selected option information element and a number of at least one selected option information element.

21. The method of claim 12, wherein the wireless communication corresponds to wireless communication in a wireless-fidelity (Wi-Fi) communication scheme.

22. The method of claim 12, further comprising:
detecting whether transmission of the frame through the wireless communication for the at least one executed application is to occur,
wherein the application type of the at least one executed application is identified in response to detection that transmission of the frame through the wireless communication for the at least one executed application is to occur.

23. A non-transitory storage medium configured to store a program comprising executable instructions which, when executed by a processor of an electronic device, causes the electronic device to:
identify an application type of at least one executed application;
select a random number of information elements for the identified application type from among designated random numbers,
randomly select at least one information element to be included in a frame for wireless communication for the at least one executed application;
based on the selected random number of information elements, set a frame body field including at least one frame comprising the at least one selected information element in a frame body field of the at least one frame;
generate at least one frame including the frame body field; and
transmit the at least one generated frame through the wireless communication,
wherein the frame body field consists of a combination of at least one information element, the combination of the at least one information element including the at least one selected information element, and
wherein a frame body field of an application is changed according to an application type of the application.

24. The electronic device of claim 1, wherein the application type of at least one executed application includes at least one of a preloaded application or a third-party application downloaded from a server.

* * * * *